United States Patent

[11] 3,607,628

| [72] | Inventor | Lars Olof Tor Wadmark<br>Nasby Park, Sweden |
|---|---|---|
| [21] | Appl. No. | 768,211 |
| [22] | Filed | Oct. 8, 1968 |
| [45] | Patented | Sept. 21, 1971 |
| [73] | Assignee | Aktienbolaget Atomenergi<br>Stockholm, Sweden |
| [32] | Priority | Dec. 3, 1965 |
| [33] |  | Sweden |
| [31] |  | 15703/1965 |
|  |  | Continuation of application Ser. No.<br>598,757, Dec. 2, 1966, now abandoned. |

[54] REFUELLING TUBE IN A WATER-COOLED NUCLEAR REACTOR
1 Claim, 1 Drawing Fig.

| [52] | U.S. Cl. ...................................................... | 176/31, 176/54 |
| [51] | Int. Cl. ....................................................... | G21c 19/20 |
| [50] | Field of Search ........................................... | 176/36–37, 54–56 |

[56] References Cited
UNITED STATES PATENTS

| 2,953,510 | 9/1960 | Anderson ...................... | 176/18 X |
| 3,180,800 | 4/1965 | Fortescue et al. ............. | 176/30 |
| 3,181,999 | 5/1965 | Schulten ....................... | 176/30 X |
| 3,183,163 | 5/1965 | Gumuchian et al. ........... | 176/30 |
| 3,205,145 | 9/1965 | Margen ......................... | 176/54 X |
| 3,336,202 | 8/1967 | Lockett et al. ................. | 176/30 |

FOREIGN PATENTS

| 974,248 | 11/1964 | Great Britain ................ | 176/30 |

Primary Examiner—Carl D. Quarforth
Assistant Examiner—Harvey E. Behrend
Attorney—Pierre, Scheffler & Parker ABSTRACT: In a water-cooled nuclear reactor, fuel is introduced into the interior of the reactor vessel through a refuelling tube which extends through a water-filled portion of the reactor core. The cooling of the refuelling tube is made possible by the provision of openings in said tube below the reactor core and above the reactor core whereby heat produced by a fuel cartridge when passing through said tube induces a flow of water through said tube.

PATENTED SEP21 1971 3,607,628
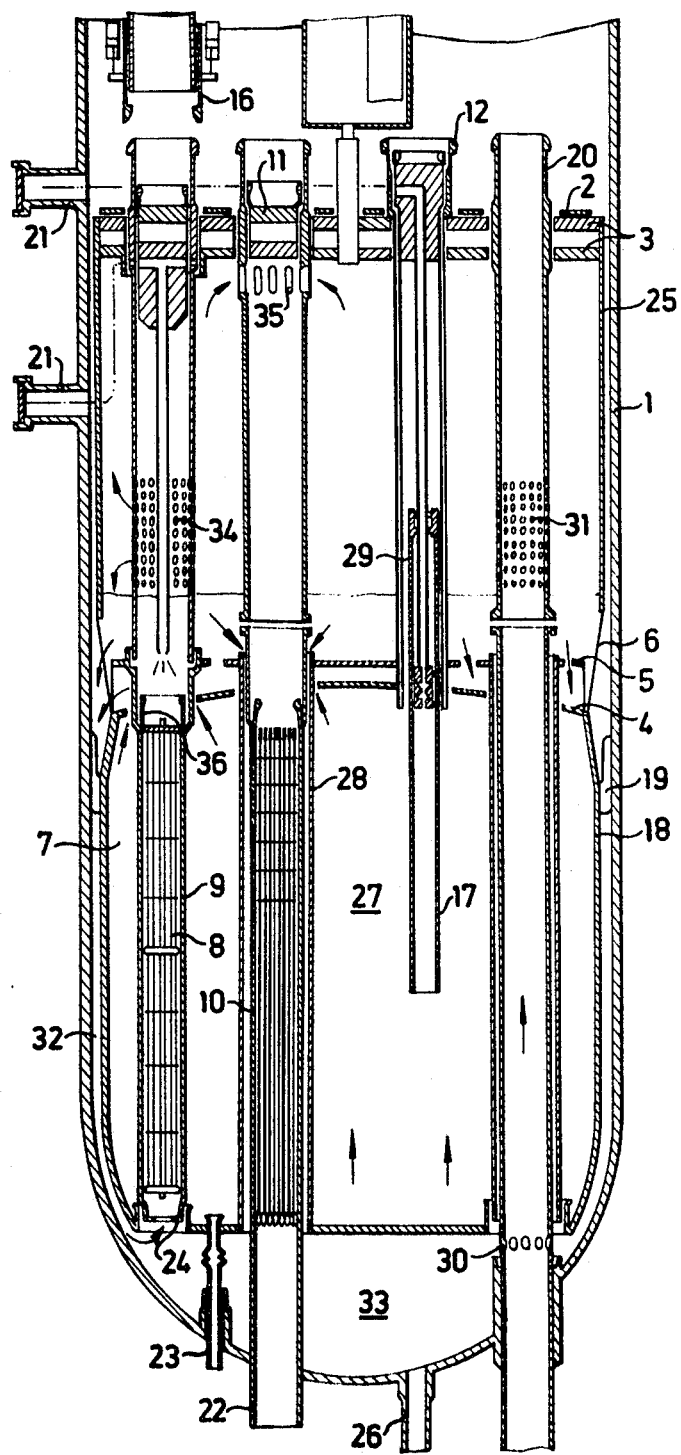

REFUELLING TUBE IN A WATER-COOLED NUCLEAR REACTOR

This application is a continuation of U.S. Pat. application Ser. No. 598,757, filed Dec. 2, 1966, now abandoned.

The invention is concerned with a refueling tube in a water-cooled nuclear reactor of the type comprising a reactor vessel, a reactor core in said vessel, a refueling tube extending through the bottom of the reactor vessel, nuclear fuel being supplied to and withdrawn from the reactor vessel through said refueling tube, and a loading machine in the reactor vessel for transferring the nuclear fuel between the refueling tube and the reactor core.

In a water-cooled nuclear reactor the reactor core is usually situated in the lower portion of the reactor vessel. It is known to remove the used nuclear fuel from the reactor through a refueling tube extending through the top of the reactor vessel, and to insert new nuclear fuel into the reactor through said refueling tube. The residual activity in the used nuclear fuel makes it necessary to cool the fuel after it has been lifted out of the core, for instance by spraying water onto the fuel. The refueling operation is less complicated if the refueling tube extends through the bottom of the reactor vessel since the refueling tube can be connected to a basin situated below the reactor. In this way the fuel can be transferred into and out of the reactor while being surrounded by water the cooling during the refueling operation being thereby facilitated. When the nuclear fuel is passing through a refueling tube extending through the bottom of the reactor vessel heat is produced, partly because of the neutron irradiation, partly because of the residual activity (in used fuel). The invention aims at a construction of the refueling tube making it possible to remove said heat in a reliable way.

The device of the invention is characterized in that the refueling tube extends through a water-filled portion of the reactor core and has openings above and below the reactor core through which a self-circulation can be maintained in the refueling tube during the passage of the nuclear fuel.

The invention will now be described with reference to the accompanying drawing which discloses a part of a nuclear reactor containing a refueling tube according to the invention.

The illustrated reactor contains a pressure vessel 1 containing a reactor core 27 in its lower portion. The core is surrounded by a calandria tank 18 separating the cooling water from the moderator water. Tubes 9 extend through the reactor core and contain nuclear fuel elements 8 for heating the water to boil. Other tubes 28 extend through the reactor core and contain nuclear fuel elements 10 for superheating the steam. The drawing only discloses one tube of each type. Tubes 17 extend through a portion of the reactor core. Control rods 29 of a neutron-absorbing material can be lowered into the core through said tubes 17 for regulating the power of the reactor.

A refueling tube 20 extends through the reactor core and has its upper portion fastened to a partition 3, which also supports the upper portion of the tubes described above. The lower portion of the refueling tube extends through the bottom of the pressure vessel and is connected, via double valves, to a basin, not shown. The refueling tube 20 is provided with a plurality of openings 31 situated above the reactor core. The total area of said openings should be at least five times the cross-sectional area of the refueling tube. The tube is also provided with a plurality of openings 30 situated below the reactor core.

The illustrated device is operated in this way. Feed water is supplied through a tube 23 connected to the calandria tank 18. The feed water flows upward through the calandria tank, acting as moderator, leaves the calandria tank through openings in its upper wall 4, mixes with hot water from the boiler elements, and flows downward in the space 32 between the calandria tank and the pressure vessel, thus reaching the space 33 in the bottom portion of the pressure vessel. The water now flows upward in the tubes 9 while being heated to boil by the fuel elements 8. The mixture of water and steam leaves the tubes 9 through openings 34. The water mixes with the moderator water coming from the calandria tank. The steam enters openings 35 in the tubes 28 and flows downward through said tubes while being superheated by the fuel elements 10. The superheated steam leaves the reactor vessel through tubes 22.

For the refueling operation a loading machine is used which is situated inside the reactor vessel. A portion of the loading machine is illustrated at 16. The loading machine lowers a rod carrying a gripping member into the tube 9, seizes a lifting member 36 on the upper end of the fuel element 8, lifts the fuel element 8 into the upper steam-filled portion of the reactor vessel, moves the fuel element sideways and lowers it into the refueling tube 20. When the fuel element is being moved through the steam space it is cooled by water being sprayed on it. When the fuel element is passing through the portion of the refueling tube 20 extending through the reactor core a boiling occurs, and said boiling produces a self-circulation, resulting in water being sucked in through the openings 30, the produced mixture of water and steam leaving the refueling tube through the openings 31. The steam leaves the reactor through the superheater tubes, and the water mixes with the moderator water and flows downward in the space 32 similarly to the water coming from the boiler tubes 9 as has been described above.

I claim:

In a water-cooled nuclear reactor including, in combination, a reactor vessel having a steam space in the upper part thereof;

a body of water in a water-filled space in the lower portion of said vessel;

a reactor core comprising a plurality of nuclear fuel elements positioned within fuel channels in said core, said core being wholly within said body of water;

a refueling tube for passage of such nuclear fuel elements to and from said core, said refueling tube extending through the bottom of the reactor vessel and through said water-filled space and through said core to said steam and water space; and a loading machine in the reactor vessel for transferring nuclear fuel elements between the refueling tube and the reactor core, the improvement according to which the refueling tube has openings therein above and below the reactor core which openings are in communication with said water-filled space below the core and said steam- and water-filled space above the core, channel means within the reactor vessel being provided for the direct passage of water from said openings above the reactor core to said openings below the reactor core, said channel means being in addition to said fuel channels, said refueling tube, said steam space, said channel means, and said water-filled space being a closed circulation system wherein during the passage of a nuclear fuel element through said refueling tube, water is sucked into said tube through said openings below the core and is conducted by said tube to said steam- and water-filled space above said core and is returned by said channel means to said water-filled space.